(12) United States Patent
Tate et al.

(10) Patent No.: US 7,122,068 B2
(45) Date of Patent: *Oct. 17, 2006

(54) PLEATED FILTER MEDIA WITH EMBOSSED SPACERS AND CROSS FLOW

(75) Inventors: Jason LaMarr Tate, Bessemer City, NC (US); Edward Allen Covington, Gastonia, NC (US); Roland Vann Lanier, Jr., Belmont, NC (US)

(73) Assignee: Wix Filtration Corp., Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/998,581

(22) Filed: Nov. 30, 2004

(65) Prior Publication Data

US 2005/0072131 A1    Apr. 7, 2005

Related U.S. Application Data

(63) Continuation of application No. 10/135,374, filed on May 1, 2002, now Pat. No. 6,824,581.

(60) Provisional application No. 60/287,420, filed on May 1, 2001.

(51) Int. Cl.
    *B01D 46/10*    (2006.01)

(52) U.S. Cl. .................... 55/497; 55/385.3; 55/502; 55/511; 55/521; 210/487; 210/493.3; 210/493.5

(58) Field of Classification Search ............... 55/385.3, 55/497, 498, 499, 502, 503, 511, 521, 385.1, 55/320, 321, 434, 444; 210/487, 493.1, 493.3, 210/493.5, 193.1
See application file for complete search history.

(56) References Cited

U.S. PATENT DOCUMENTS

| | | | | |
|---|---|---|---|---|
| 5,066,400 A | * | 11/1991 | Rocklitz et al. | 55/521 |
| 6,315,805 B1 | * | 11/2001 | Strauss | 55/486 |
| 6,402,800 B1 | * | 6/2002 | Rey | 55/521 |
| 6,824,581 B1 | * | 11/2004 | Tate et al. | 55/385.3 |

FOREIGN PATENT DOCUMENTS

JP    5-131104    *   5/1993

* cited by examiner

*Primary Examiner*—Jason M. Greene
(74) *Attorney, Agent, or Firm*—Honigman Miller Schwartz and Cohn LLP

(57) ABSTRACT

A panel filter element has a pleated filter media having peaks and valleys arranged in pleated sets of first and second panels. The pleated sets are adhered along side edges to form clean-side pockets which open adjacent to the valleys. The first and second panels have elongated embossments projecting both into and away from the pockets to keep the pockets open and to keep the pleated sets separate. Dirty air flows into the filter media both transverse to the peaks and laterally between the pleated sets of first and second panels. By having dirty air to be filtered flowing both transversly and laterally, the dirt holding capacity of the filter is increased while increases in restriction are minimized.

2 Claims, 7 Drawing Sheets

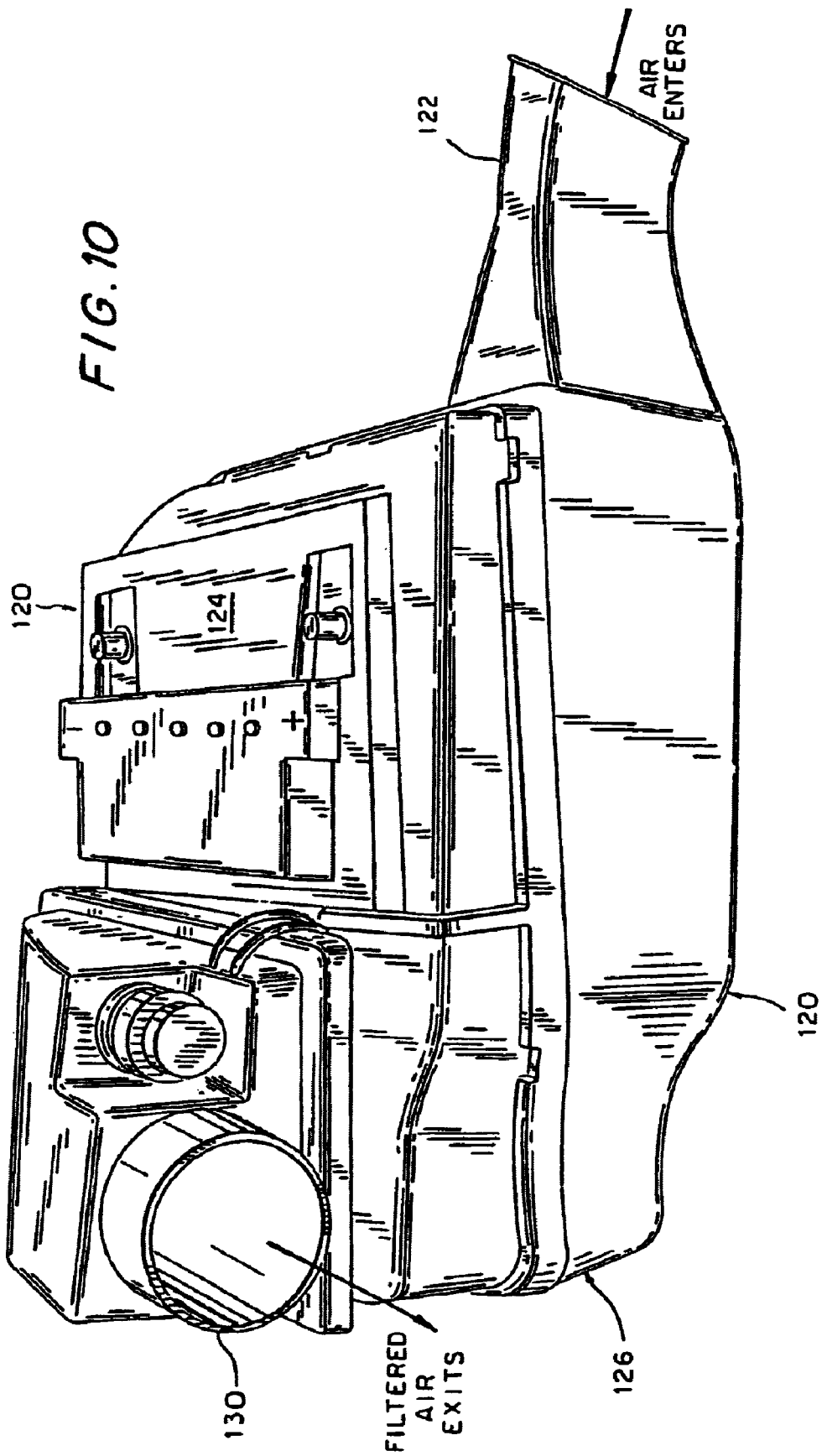

PLEATED FILTER MEDIA WITH EMBOSSED SPACERS AND CROSS FLOW

RELATED APPLICATIONS

This application is a continuation of U.S. patent application Ser. No. 10/135,374, filed May 1, 2002 which will issue on Nov. 30, 2004, now U.S. Pat. No. 6,824,581 and incorporated by reference herein.

RELATED PATENT APPLICATION

This application claims priority from provisional application Ser. No. 60/287,420 filed May 1, 2001 and titled "Cross Flow Filter Element."

FIELD OF THE INVENTION

The present invention relates to a filter element having a filter media with embossed spacers. More particularly, the present invention is directed to a filter element having a filter media with embossed spacers which allow for cross flow of dirty air into the filter media.

BACKGROUND OF THE INVENTION

Filter elements which use filter media having spacer arrangements between panels of the media for filtering particulate bearing fluid streams are known in the art. However, the spacers tend to be inserted elements which increases the cost of filter media and can compromise the reliability of the filter media. This is because inserted spacers can become dislodged and damage the filter media if on the upstream or dirty side of the filter media. If on the clean side of the filter media, the spacers can become dislodged and possibly damage the machinery served by the filter media.

With respect to air filters for internal combustion engines, there is continuing need to increase dirt holding capacity while reducing restriction. Preferably, this is accomplished as inexpensively as possible. With respect to filters for diesel trucks, increased dirt holding capacity with acceptable restriction levels is currently only obtainable with cylindrical filters used for medium and heavy duty applications. In order to conserve space in engine compartments panel air filters are now being employed, but panel air filters have encountered the aforementioned problems of reduced dirt holding capacity and relatively high restriction. Accordingly, there is a need for improvement in panel air filters.

SUMMARY OF THE INVENTION

In view of the aforementioned considerations, a panel filter element having a pleated filter media is utilized wherein the pleated filter media has plurality of embossments with first sets of embossments projecting from the clean side of the pleats and second sets of embossments projecting from the dirty side of the pleats. Edges of the pleats are closed. Consequently, dirty air flows both transversely through the dirty-side face of the filter media and laterally between the pleats.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 10 is a perspective view of an air cleaner for engine combustion air which utilizes the filter element of FIGS. 1–9.

DETAILED DESCRIPTION

Figure 1:
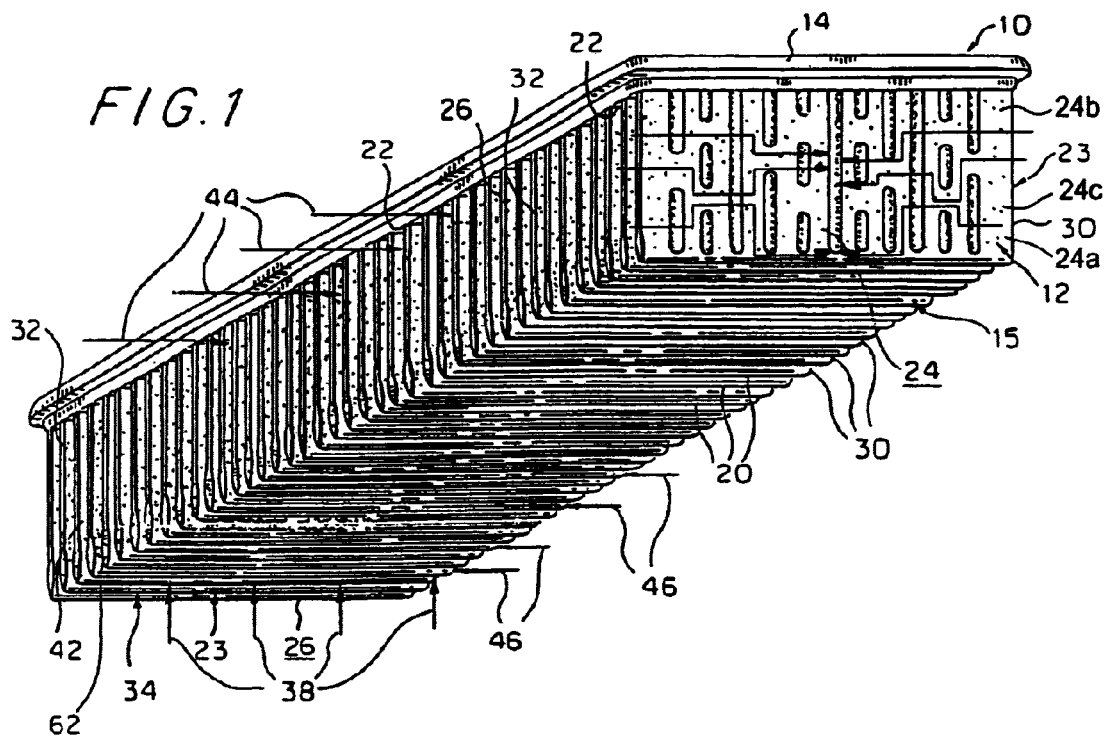
FIG. 1 is a bottom perspective view of the filter element configured in accordance with the present invention.
Figure 2:
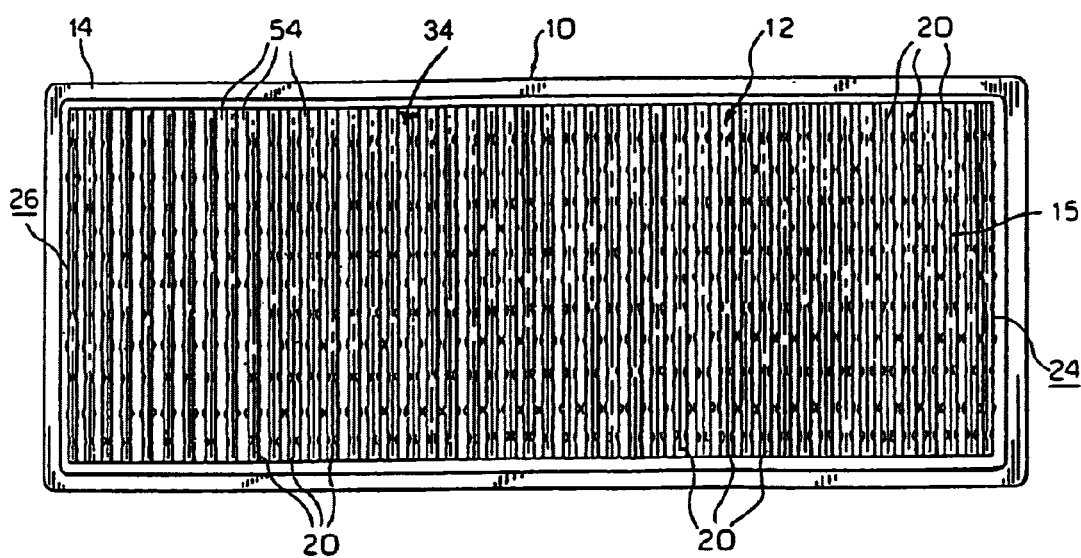
FIG. 2 is a bottom planar view of the filter of FIGS. 1 and 2.
Figure 3:
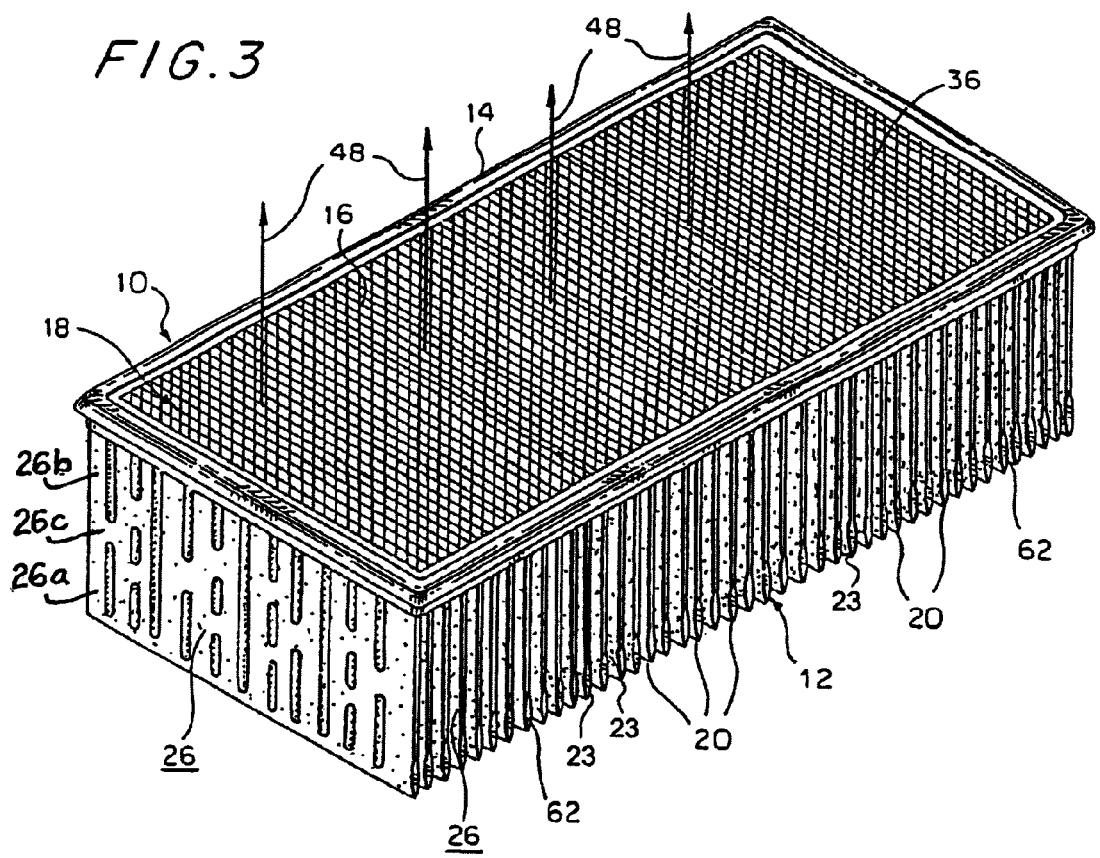
FIG. 3 is a top perspective view of the filter element of FIG. 1.
Figure 4:
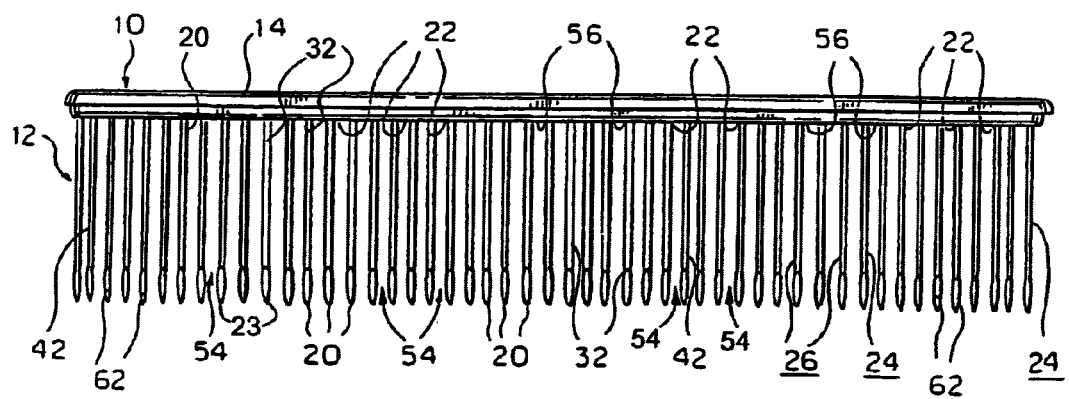
FIG. 4 is a side view of the filter of FIGS. 1–3.

Referring now to FIGS. 1, 2 and 3 there is shown a filter element 10 configured in accordance with the principles of the present invention. The filter element 10 includes a pleated filter media 12 and a peripheral seal 14. The peripheral seal 14 is made of a rubber or rubber-like polymer material, for example polyurethane. FIGS. 1 and 2 illustrate the dirty side 15 of the filter element 10. As is seen in FIG. 3, the top of the filter element 10 is covered by an expanded metal screen 16 which covers the clean side 18 of the filter element 10.

Pleated filter media 12 has peaks 20 and valleys 22 defined by pleat forming sets 23 of first and second panels 24 and 26 that are closed adjacent first and second edges 30 and 32. Peaks 20 occur in a plane which defines a dirty-side face 34 of the filter media 12, while the valleys 22 occur in a plane which defines a clean-side face 36 of the filter media. In accordance with the principles of the present invention, dirty air enters the filter media in directions transverse to the dirty-side face 34 as indicated by arrows 38 and laterally to the dirty-side face through side filter media faces 40 and 42 of the first and second panels 24 and 26 in the directions of arrows 44 and 46, respectively. As is seen in FIG. 3, clean air exits the filter element 10 through the clean side face 36 in the direction of arrows 48. The peaks 20 and valleys 22 are determined by the direction 38 of dirty air flow through the filter media 12 so that the peaks are at the bottom and the valleys are above the peaks.

Referring now to FIGS. 4-7 showing side and end views of the filter element 10, it is seen that the pleat sets 23 formed by the first and second panels 24 and 26 are adhered only at their edges 30 and 32 (FIG. 1). Consequently, gaps 54 are maintained between adjacent pleat forming sets 23. Accordingly, dirty air can pass laterally between the pleat sets 23 in the direction of arrows 44 and 46 (see FIG. 1). Spacing is maintained between the pleat sets 23 adjacent the edges 30 and 32 by having substantially flat or obtuse valley floors 56 to keep the edges 30 and 32 of the sets 23 spaced from one another, and by having arrays 60 of spaced embossments and a continuous embossment 61 projecting from the dirty sides 40 and 42 of the first and second panels 24 and 26. The embossments 60 have spaces 64 therebetween to allow dirty air to continually pass laterally between the sides 40 and 42 of the pleated filter media 12. As will be explained hereinafter, the embossments 60 cooperate not only to keep the pleated sets 23 in spaced relation, but also stiffen the pleats and distribute air over the pleats in an even fashion so as to increase the capacity of the filter media 12 while reducing restriction.

Figure 5:
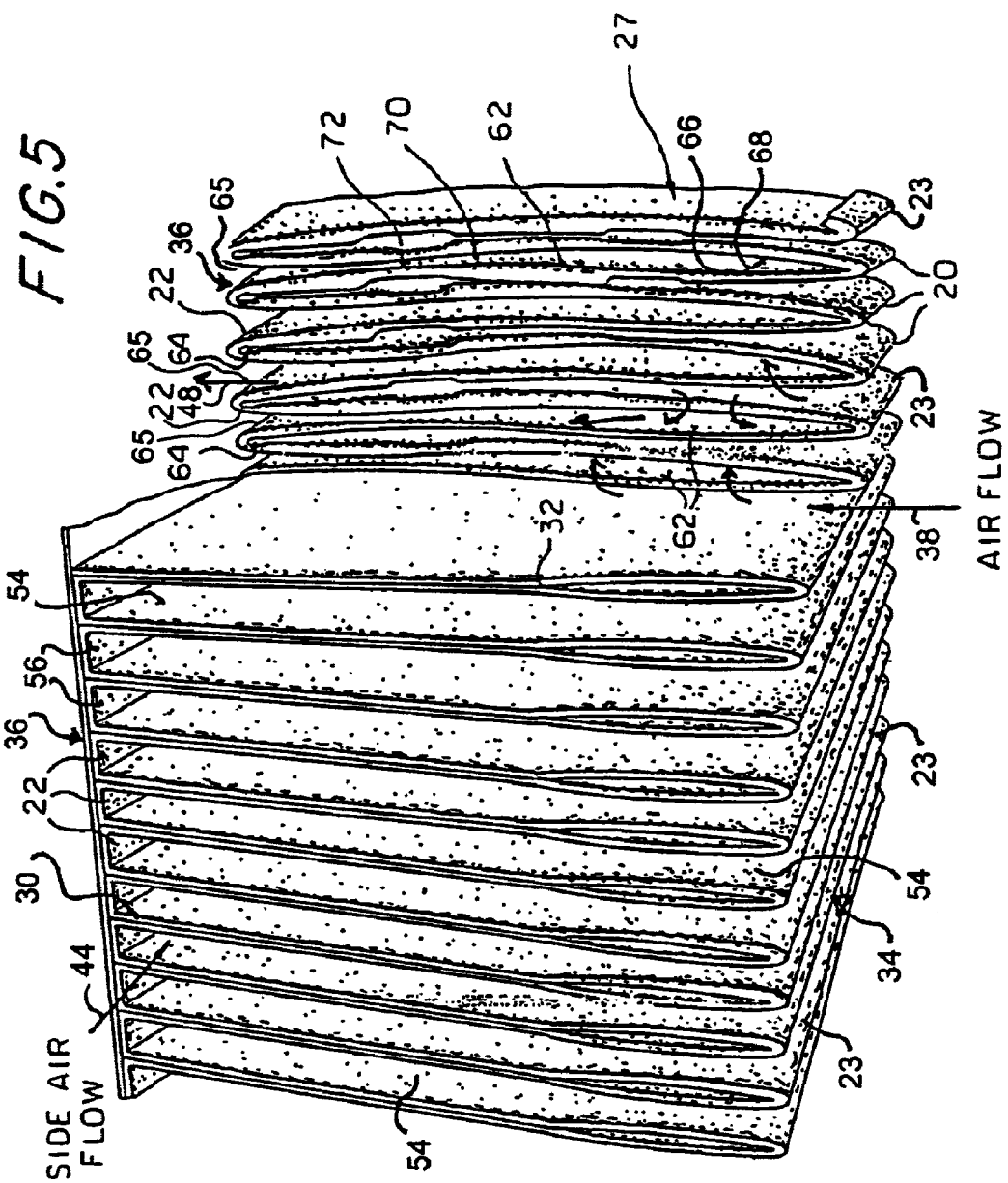
FIG. 5 is a bottom perspective view of the filter of FIGS. 1–4 showing a portion of the filter media cut away.

Referring now mainly to FIG. 5, where the filter media 12 has been severed through the pleated sets 23 to reveal pockets 62, which open upwardly through openings 65 which coincide with the clean side face 36 of the filter element 10. As with the dirty sides 40 and 42 of the panels 24 and 26, clean sides 66 and 68 of the panels are kept separated by arrays of spaced embossments 70 projecting from the first and second panels 24 and 26 into the pockets 62. As with the dirty sides of the panels the embossments 70 abut but have gaps 72 therebetween so that clean air in a direction 48 flows from the peaks 20 toward the openings 65, and is channeled by the embossments 70. If necessary the clean air can pass laterally through the gaps 72 between embossments 70 so as to even out clean air flow and make it more laminar, which is desirable if the clean air is combustion air for an internal combustion engine.

Figure 6:
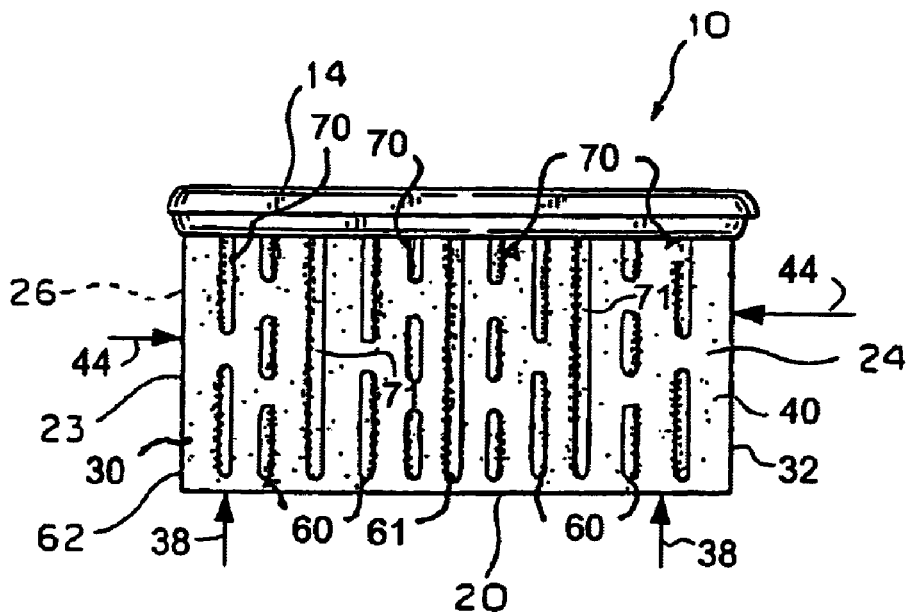
FIG. 6 is a first end view of the filter element showing a first panel.
Figure 7:
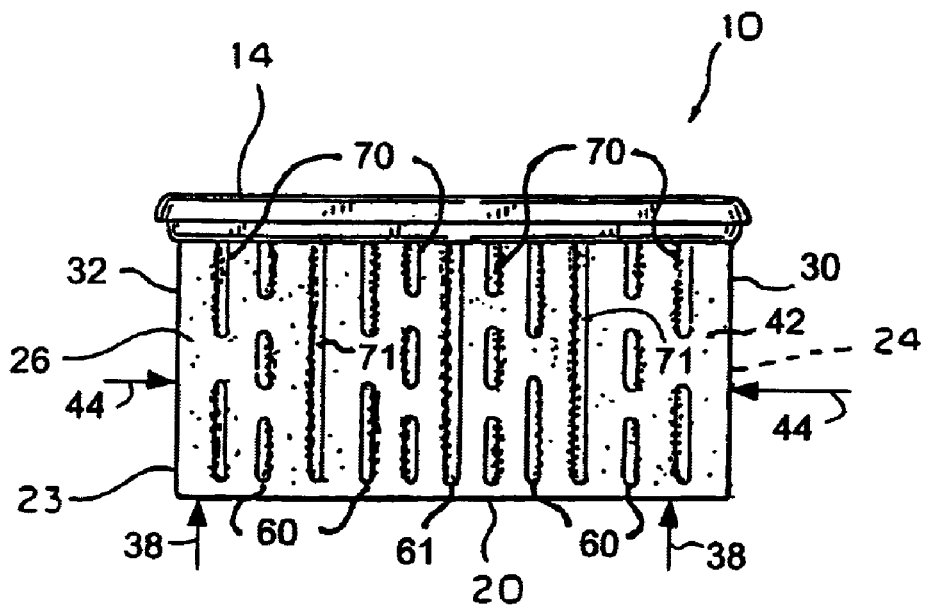
FIG. 7 is a second end view of the filter element showing a second panel.

Referring now mainly to FIGS. 6 and 7 as well as FIG. 5 wherein end views of the filter element 10 reveal embossment structure, it is seen that the first and second panels 24 and 26 have the arrays of spaced embossments 60 and 70 that respectively keep the pleat sets 23 spaced from one another and keep the pleat sets 23 open to define the interior pockets 62 (FIG. 5). The first panel 24 and the second panel 26 are substantially identical so that when the first and second panels are folded at the peaks 20, the arrays of spaced embossments 70 abut within the pocket 62 (see FIG. 5) with gaps 72 therebetween, while the elongated continuous embossments 71 abut, and with the closed edges 30 and 32, form three substantially closed first channels within the pockets 62.

Figure 8:
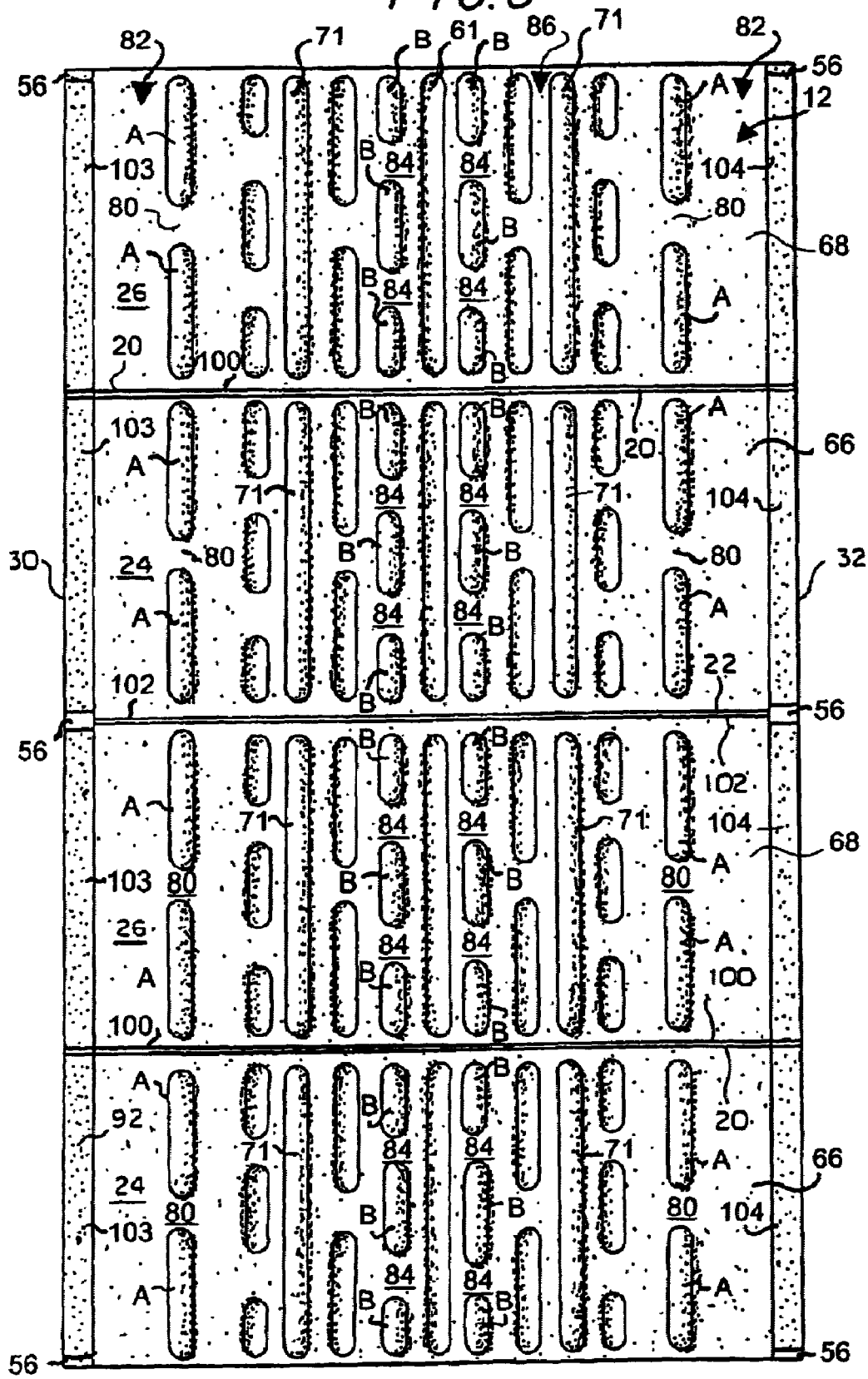
FIG. 8 is a planar view of the dirty side of the filter media before being pleated.

Referring now to FIG. 8 where the clean sides 66 and 68 of the filter media 12 are shown prior to folding the media web 12 at peaks 20 and valleys 22, it is seen that upon folding the media web, pairs of spaced embossments A abut within the pockets 62 of FIG. 5. Gaps 80 occur between the spaced embossments A. The two elongated continuous embossments 71 with the opposite edges 30 and 32 of the filter media 12 form a pair of closed channels 82 adjacent opposite edges. The spaced columns of three embossments B, with spaces 84 therebetween are in a central channel 86 in pockets 62 (FIG. 5) between a pair of the elongated continuous embossments 71. Upon folding the filter media 12 so that the panels 24 and 26 have clean-side surfaces 66 and 68 in abutment and then adhering the edges 30 and 32 to one another with beads of adhesive, the interior pockets 62 of FIG. 5 are created.

Figure 9:
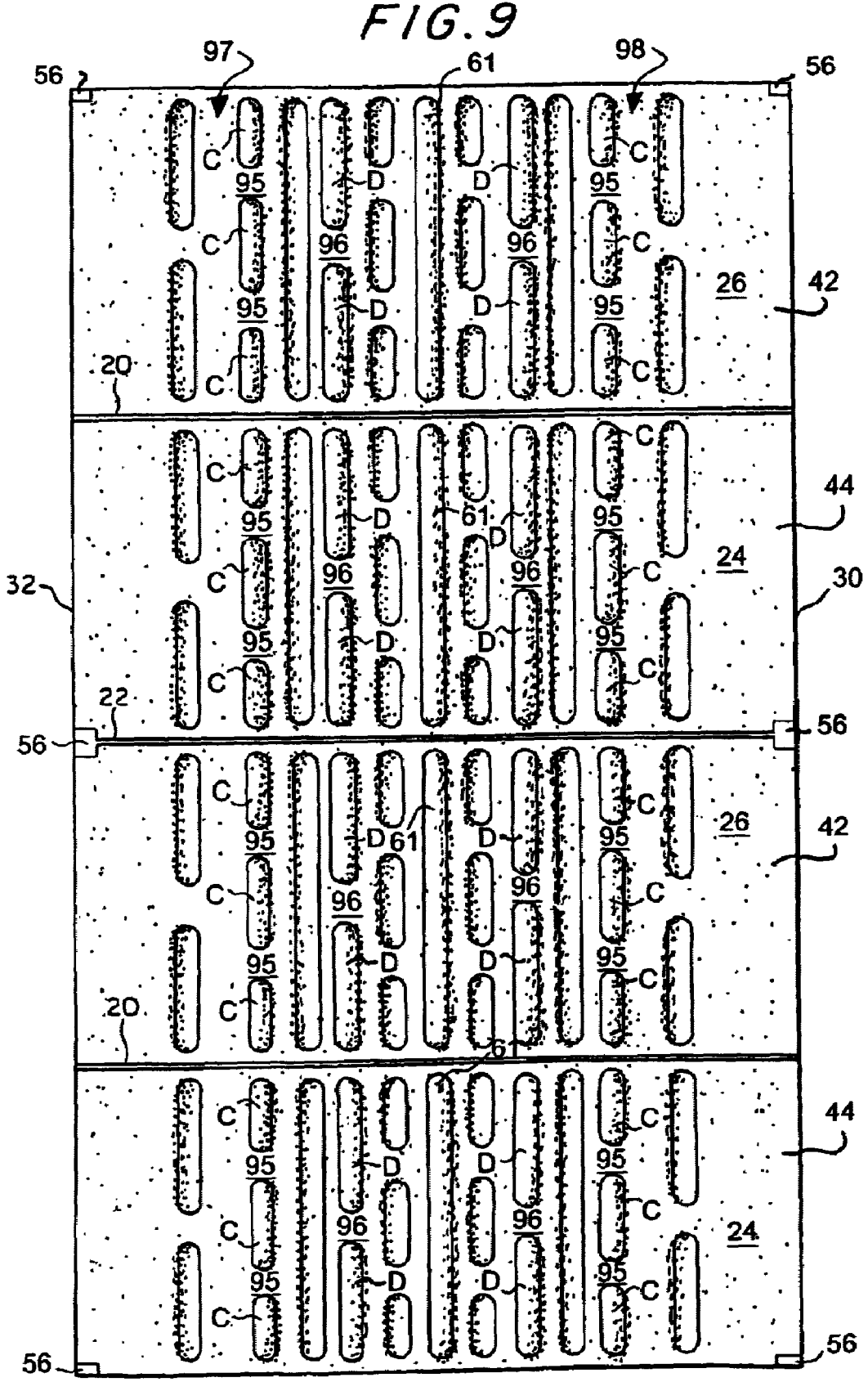
FIG. 9 is a planar view of the clean side of the filter media before being pleated.

Referring now to FIG. 9, a second array of embossments 61, including three spaced embossments C separated by spaces 95; pairs of embossments D separated by spaces 96, and the continuous central embossment 61, project from the dirty sides 40 and 42 of the first and second panels 24 and 26. These embossments abut one another to help keep the pleated sets 23 separated to provide the gaps 54 therebetween (see FIGS. 4 and 5). When folded, the continuous center embossment 61 channels air through the dirty-side face 34 and between the sides edges 30 and 32 in two separate channels 97 and 98 on the dirty side of the filter media 12.

As is seen in FIGS. 8 and 9 where the filter media 12 is shown flat prior to folding at creases 100 and 102 to form the peaks 20 and valleys 22, it is seen that first and second panels 24 and 26 are identically embossed so that upon folding, the appropriate embossments face one another to provide interior and exterior spacing. As is seen in FIG. 8, at least the first panels 24 have beads of adhesive 103 and 104 proximate edges 30 and 32, respectively. The panels 24 and 26 are folded along the creases 100 and 102 to form the peaks 20 and valleys 22 of the pleated filter media with the adhesive beads 103 and 104 adhering the edges 30 and 32 of the panels 24 and 26 together so as to form the pockets 62 shown in FIG. 5. Each valley 22 has the flattened area 56 at each end in order to help keep the edge portions 30 and 32 of adjacent panels 24 and 26 separate. In that the seal 14 is molded around the filter media 10, the material of the seal engages and wedges adjacent the flattened panel portion 56 to help stiffen the base portion of the filter media formed by the valleys 22.

As is evident from FIGS. 2–9 of the drawings, the filter element 10 has a filter media 12 which includes panels 24 and 26 defined by pleats at the peaks 20 and valleys 22. In this description, the peaks 20 occur where the dirty air stream 38 encounters the dirty side face 34 and the valleys 22 occur adjacent to the clean-side face 36. Accordingly, there are top sections 24a and 26a of the panels 24 adjacent to the pleats formed by the peaks 20 and bottom sections 24b and 26b adjacent to the pleats formed by the valleys 22. There are middle sections 24c and 26c between the top sections 24a and 26c and the bottom sections 24b and 26b.

Within the gaps 54 and in the pockets 52 the embossments abut the spaces therebetween in the middle section 24c and 26c of the panels 24 and 26 to form labyrinths wherein only torturous paths (not straight line paths) exist from one sealed edge 30 to the other sealed edge 32. The torturous paths are created by the gaps 80 between the embossments A and the gaps 84 between the embossments B of FIG. 8, and by the gaps 95 between the embossments C and the gaps 96 between the embossments D. The gaps 80 and 84 are not aligned and the gaps 95 and 96 are not aligned so that the air streams can not move laterally without being deflected by at least one embossment.

The aforedescribed filter element has use as an air filter for internal combustion engines. Since the height of the pleats is approximately 3 inches, the various embossments described provide stiffness as well as spacing.

FIG. 10 illustrates an air cleaner 120 for an internal combustion engine (not shown) in which a filter element 10 embodying the principles of the present invention is used. Dirty air enters the air cleaner 120 through an inlet 122, passes adjacent to and around a storage battery 124 and into a filter housing 126. The dirty air then rises through the dirty-side face 34 of the filter media 12 (FIG. 1) within the filter housing as well as passing laterally through the sides of the filter media. Clean air passes through the clean-side face 34 (FIG. 1) of the filter media 12 and out of the outlet 130 for combustion by the associated engine.

While the filter element 10 is shown being used to filter air, the structure of the filter media 12 and filter element is usable to filter other gases as well as fluids in general including liquids.

From the foregoing description, one skilled in the art can easily ascertain the essential characteristics of this invention, and without departing from the spirit and scope thereof, can make various changes and modifications of the invention to adapt it to various usages and conditions.

We claim:

1. A pleated filter element with sealed edges and embossments projecting from at least one side of a filter media, the filter media including panels defined by pleats, wherein each panel has top and bottom sections adjacent the pleats and the middle section between the top and bottom sections, each pleat panel having a plurality of embossments in the middle section arranged in a labyrinth with some of the embossments being elongated and spaced to form gaps that allow fluid to flow between the embossments and wherein some embossments extend continuously from the top section to the bottom section to form channels directing fluid flow in a direction transverse to the top and bottom sections, whereby no direct path exists through the middle section from one sealed edge to the opposite sealed edge through embossment gaps.

2. A pleated filter element with sealed edges and embossments projecting from at least one side of a filter media, the filter media including panels defined by pleats, wherein each panel has top and bottom regions adjacent the pleats and a middle region between the top and bottom regions, each pleat panel having embossments in the middle section arranged in a labyrinth with at least one embossment extends continuously from the top section to the bottom section to form channels directing fluid flow in a direction transverse to the top and bottom sections, whereby a no straight line path occurs the panel in the middle region from one sealed edge to the opposite edge without being deflected by at least one embossment.

* * * * *